(12) United States Patent
Nunokawa et al.

(10) Patent No.: US 6,310,617 B1
(45) Date of Patent: Oct. 30, 2001

(54) DISPLAY METHOD, METHOD OF STORING IMAGE INFORMATION, DISPLAY APPARATUS, NAVIGATION APPARATUS AND AUTOMOBILE

(75) Inventors: Katsuhiko Nunokawa; Takeshi Ota, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/430,685

(22) Filed: Oct. 29, 1999

Related U.S. Application Data (62) Division of application No. 09/031,721, filed on Feb. 27, 1998.

(30) Foreign Application Priority Data

Feb. 28, 1997 (JP) .................................................... 9-046409

(51) Int. Cl.⁷ ..................................................... G09G 5/00
(52) U.S. Cl. ............................ 345/211; 345/507; 340/995
(58) Field of Search ..................................... 345/211, 507, 345/508; 340/990, 995, 996

(56) References Cited

U.S. PATENT DOCUMENTS

| | | | |
|---|---|---|---|
| 5,278,673 | * | 1/1994 | Scapa et al. .......................... 358/473 |
| 5,339,444 | * | 8/1994 | Nakajima ............................. 395/750 |
| 5,355,490 | * | 10/1994 | Kou ...................................... 395/47 |
| 5,426,629 | * | 6/1995 | Saitou et al. .......................... 369/99 |
| 5,469,565 | * | 11/1995 | Hibi ..................................... 395/575 |
| 5,485,439 | * | 1/1996 | Hamasaka et al. .................... 369/47 |
| 5,745,391 | * | 4/1998 | Topor ............................... 395/182.22 |

* cited by examiner

*Primary Examiner*—Dennis-Doon Chow
(74) *Attorney, Agent, or Firm*—Jay H. Maioli (57) ABSTRACT

A navigation apparatus for displaying map information recorded in a recording medium so that previously stored information is displayed until new information is read and processed from another recording medium when the recording medium is replaced.

8 Claims, 7 Drawing Sheets

DISPLAY METHOD, METHOD OF STORING IMAGE INFORMATION, DISPLAY APPARATUS, NAVIGATION APPARATUS AND AUTOMOBILE

This application is a division of Ser. No. 09/031,721, filed on Feb. 27, 1998.

BACKGROUND OF THE INVENTION

The present invention relates to a method of display suitable for use on a mobile body such as an automobile or the like to detect the present or current position of the same and to display a map showing the area in the vicinity of the point of detection, a method of storing image information used for purposes including providing such a display or the like, a display apparatus and a navigation apparatus employing such a method of display and such a method of storing image information, and an automobile carrying such a navigation apparatus.

Various navigation apparatuses loaded on a mobile body such as an automobile or the like have been developed. For example, such a navigation apparatus is comprised of a means for reading a mass data recording medium such as a CD-ROM storing data of road maps, a means for detecting a present or current position and a display apparatus for displaying a road map for an area in the vicinity of the detected current position based on data read from the data storage medium. In this case, the means for detecting the current position may employ a positioning system referred to as a GPS (global positioning system) utilizing a signal transmitted from a satellite for positioning (hereinafter simply referred to as a GPS), an autonomous navigation (self-contained navigation) method wherein the current position of a vehicle is measured by tracing the transition of the current position from the starting point based on information including the traveling direction and traveling speed of the vehicle, or the like.

The data of a road map for an area in the vicinity of the current position detected by such a current position detecting means is read from a mass data recording medium such as a CD-ROM or the like. Then, a display signal (video signal) for displaying the road map is generated and this video signal is supplied to a display apparatus (which utilizes a liquid crystal display panel in most cases) to display the road map in the vicinity of the current position.

It takes time for such display apparatuses including such a navigation apparatus or the like to display an image such as a map or the like on the display thereof after the apparatuses are activated. For example, when the navigation apparatus is activated, a controller in the navigation apparatus performs processes for determining the current position and reading a map information on an area in the vicinity of the determined position from a recording medium such as a CD-ROM or the like. Such processes are somewhat time-consuming, and some additional time is also required to draw a map based on the read map information and to obtain a display signal therefrom. Therefore, it has taken several tens of seconds for the apparatus to actually display a map of roads in the vicinity of the current position on the display apparatus thereof after the power supply of the apparatus is turned on.

The problem of the long time spent before a map is displayed not only in activating the apparatus by turning the power supply on but also in displaying a map or the like based on information read from a newly loaded recording medium in the case of the replacement of a recording medium such as a CD-ROM or the like loaded in the apparatus. Specifically, since the amount of map data recordable on, for example, a single CD-ROM loaded in the navigation apparatus is limited, it is often required to replace such a CD-ROM when a need for map information on areas recorded on other CD-ROMs arises as the travel proceeds or when there is a need for information for displaying a more detailed map even for the same area. In such cases, it has taken several tens of seconds before an image of a map or the like is newly displayed because the apparatus performs a process of reading a map information or the like from a newly loaded disk and a displaying process based on the read information similarly as encountered in the above-described case of activating the apparatus by turning the power supply on.

When it takes a long time to display a map or the like as encountered at the time of the activation of an apparatus or the replacement of a recording medium as described above, a user can not confirm his or her position on the map in such a period, which reduces the convenience of use of a navigation apparatus. Although a navigation apparatus has been described as an example, the same problem arises in various display apparatuses which display images and the like based on information read from similar recording media.

SUMMARY OF THE INVENTION

In view of such aspects, it is an object of the present invention to provide a preferable display of a map or the like based on information read from a recording medium after a short waiting time at the time of activation of the apparatus or the replacement of the recording medium.

According to an aspect of the present invention, a display method includes a step of saving predetermined information in a non-volatile storage means immediately before a power supply is turned off, a step of reading the predetermined information from the non-volatile storage means when said power supply is turned on, and a step of performing a desired display process based on the read predetermined information.

DETAILED DESCRIPTION OF PREFERRED EMBODIMENT

A preferred embodiment of the present invention will now be described with reference to the accompanying drawings.

Figure 1:
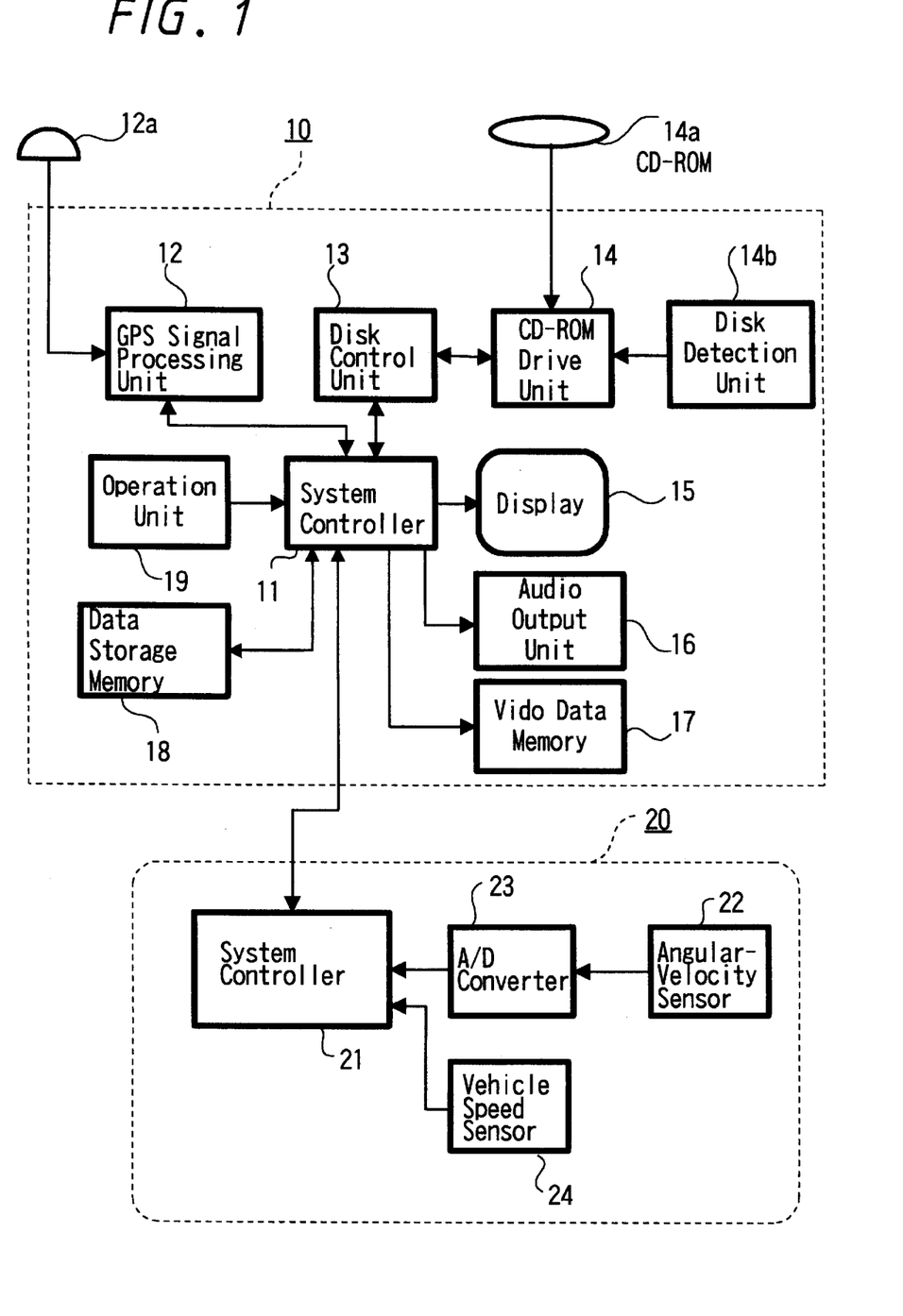
FIG. 1 is a block diagram showing a configuration of an apparatus according to an embodiment of the present invention.

In the present embodiment, the present invention is applied to a navigation apparatus which is loaded and used on a vehicle (automobile) which is a mobile body. FIG. 1 shows a whole configuration of the same.

The configuration of the navigation apparatus according to the present embodiment will now be described with reference to FIG. 1. The operation of each part of a navigation apparatus 10 is controlled by a system controller 11 constituted by a microcomputer. Referring to the configuration of each part, a GPS antenna 12a is connected to the navigation apparatus 10, and a signal received by the antenna 12a is supplied to a GPS signal processing unit 12. The GPS signal processing unit 12 performs a signal receiving process for a positioning system referred to as a GPS (global positioning system). Specifically, it receives positioning signals for the GPS transmitted from a plurality of positioning satellites and analyzes data included in the signals to obtain data of the present or current position (latitude, longitude and altitude). The data at the current position obtained by the GPS signal processing unit 12 is supplied to the system controller 11.

The system controller 11 is a controller which performs control such that a map of roads in the vicinity of the measured current position and, when it receives measured data of a position from the GPS signal processing unit 12, it sends a command to a disk control unit 13 to cause it to read a map of roads in the vicinity of the corresponding position. The disk control unit 13 controls the reading of the map data from a CD-ROM 14a (which is provided here as a map disk to store data of road maps) loaded in a CD-ROM driver unit 14 and causes the read map data to be stored in an image data memory 17 connected to the system controller 11. The image data memory 17 may be a storage means such as a dynamic RAM or the like that requires a power supply and the like to save data stored therein.

In the present embodiment, a data saving memory 18 is connected to the system controller 11 in addition to the image data memory 17 to save various data such as image data and so on in the data saving memory 18 under the control of the system controller 11. A non-volatile storage means such as a static RAM or the like is used as the data saving memory 18. Alternatively, a storage means that requires a back-up power supply may be used in combination with a power supply for the back-up as the non-volatile storage means. A process utilizing the data saving memory 18 will be described later on.

The CD-ROM driver unit 14 is provided with a disk detecting unit 14b which detects that a disk such as a CD-ROM or the like is loaded on the CD-ROM driver unit 14, and the detected information by the disk detecting unit 14b is supplied to the system controller 11 through the CD-ROM driver unit 14. Thus, the system controller 11 can determine whether a disk is loaded or not and whether a disk has been replaced. Further, the CD-ROM driver unit 14 of the present embodiment is configured to allow a process of reproducing an audio CD on which audio data and the like are recorded in addition to the CD-ROM on which various data are recorded. It is capable of providing an audio output reproduced by an audio output unit 16 to be described later or the like under the control of the system controller 11.

The data of road maps stored in the map disk 14a is comprised of, for example, the data of the coordinates of starting and end points of each road and the data of the vector connecting the starting and end points. The map disk 14a also stores additional data required for displaying the road maps.

When the map data read from the map disk 14a is transferred to the memory 17, the system controller 11 performs a process drawing a map of roads in a predetermined range included in the map data and generating a display signal for displaying the map. Alternatively, it may generate a display signal for displaying information other than the map. The generated display signal is supplied to a display 15 to display the road map and the like on the screen of the display 15. As the display 15, for example, a relative compact display utilizing a liquid crystal display panel is used such that it can be installed at a place such as the neighborhood of a driver seat of an automobile. Further, the display 15 may be constituted by an element separate from the main body of the navigation apparatus 10. When such a separate element is used, it may be a television receiver or the like other than a display exclusively used for navigation.

Information on the operation of an operating unit 19 comprised of keys and the like is supplied to the system controller 11 to cause the navigation apparatus to perform a process based on a mode set by the operation of the operating unit 19. For example, when a road map is to be displayed, the display range, the display scale and the display direction of the map can be set through the operation of the operating unit 19.

The operating unit 19 is provided with a power supply key of the navigation apparatus which is operated to turn the power supply to each part of the navigation apparatus on/off under the control of the system controller 11. In this case, the turning on/off of image display on the display 15 is also controlled collectively through the operation of the power supply key. In the navigation apparatus of the present embodiment, the system controller 11 can perform the minimum control operation even when the power supply key is operated to set a power supply off state. Control processes performed in this power supply off state will be described later. Instead of providing the power supply key for the navigation apparatus, a configuration may be employed wherein the power supply of the navigation apparatus is turned on/off in conjunction with the turning on/off of an engine key of the automobile.

An autonomous navigation unit 20 is connected to the navigation apparatus 10 of the present embodiment to allow the position measuring even when the positioning signals for the GPS from satellites can not be received for some reason. Specifically, the autonomous navigation unit 20 includes a system controller 21 which communicates with the navigation apparatus 10, an angular velocity sensor 22 as an azimuth sensor, a digital-to-analog converter 23 for converting the output of the angular velocity sensor 22 into digital data, and a vehicle speed sensor 24 for counting vehicle speed pulses in proportion to the speed of a vehicle output from a computer for controlling an automobile engine or the like. The angular velocity data as a result of the conversion at the converter 23 and the data counted by the vehicle speed sensor 24 is supplied to the system controller 21 of the autonomous navigation unit from which the data is supplied to the system controller 11 of the navigation apparatus as occasion demands. Based on the outputs of the sensors 22 and 24 supplied, the system controller 11 calculates the positional transition from a starting point to measure the current position on an autonomous navigation basis.

Figure 2:
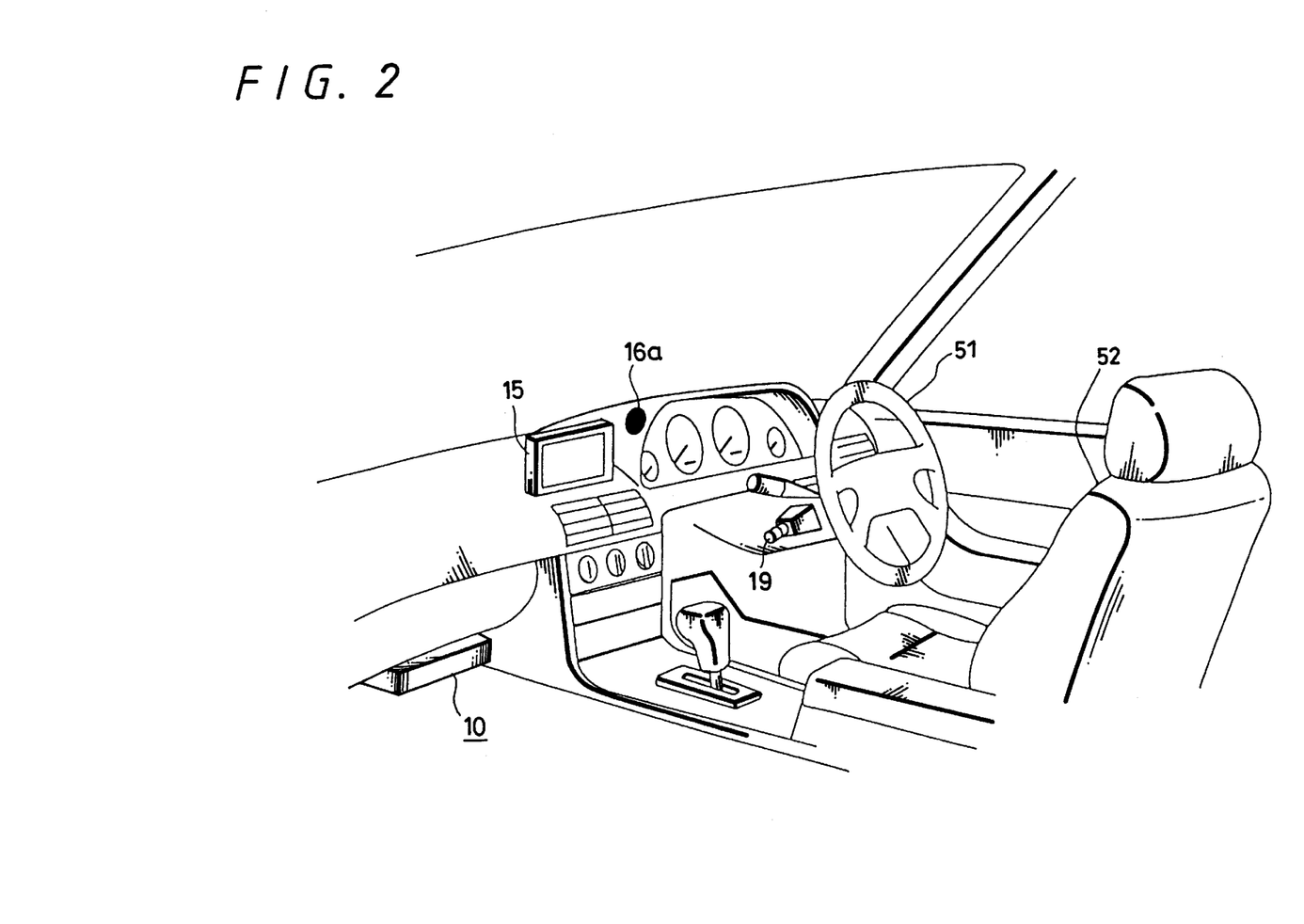
FIG. 2 is a perspective view of the apparatus according to the embodiment mounted on an automobile.

A description will now be made with reference to FIG. 2 on an example wherein the navigation apparatus 10 of the present embodiment is installed on an automobile. Here, an example is shown in which the display 15 is an element separate from the navigation apparatus 10, wherein the main body of the navigation apparatus 10 or the like is secured to a predetermined position in the vehicle (in this case, a space under the dash-board) and the display 15 constituted by a thin liquid crystal display apparatus is located on the dash-board beside a steering wheel 51 in front of a driver's seat 52. In this case, the operating unit 19 has a joystick-type configuration and is mounted beside the steering wheel 51 such that it can be easily operated during driving. Further, a speaker 16a connected to the audio output unit 16 of the navigation apparatus 10 is located at a predetermined position in the automobile. A speaker included in the display 15 may be used as this speaker 16a.

Figure 3:
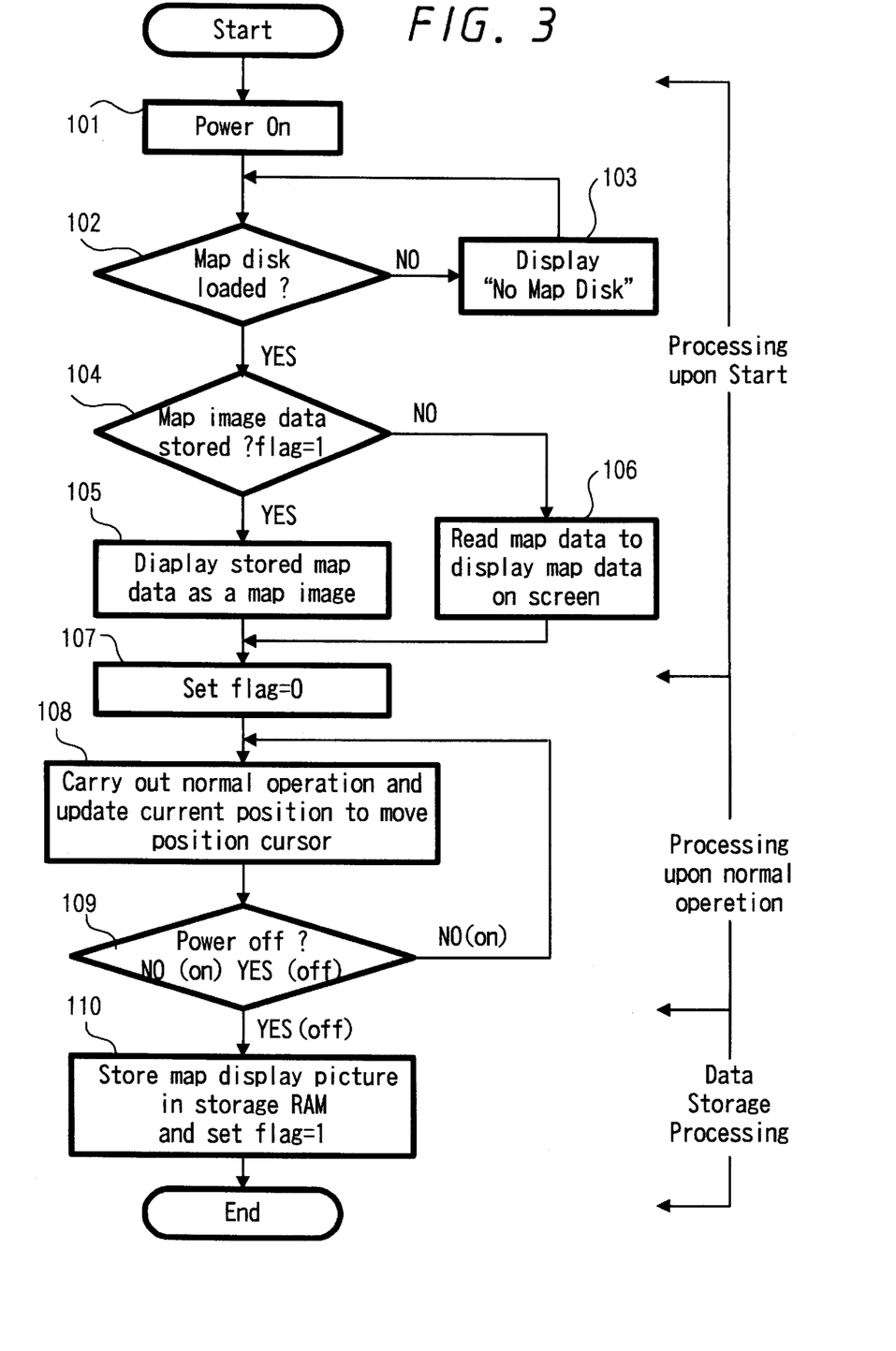
FIG. 3 is a flow chart of a process of displaying a map screen immediately upon the activation of the apparatus according to the embodiment.

A description will now be made on a process performed by the navigation apparatus 10 of the present embodiment to display a road map under the control of the system controller 11. The flow chart in FIG. 3 shows a process for displaying a map screen as soon as the power supply of the navigation apparatus 10 of the present embodiment is turned on. The process will be described below with reference to FIG. 3. Referring first to a process performed at the time of the activation of the apparatus, when a command is provided through an operation of the power supply key forming the operating unit 19 to turn on the power supply of the navigation apparatus 10 the power supply of each part of the apparatus is turned on under the control of the system controller 11 (step 101). At this time, it is determined whether a disk 14a having map data recorded thereon is loaded on the CD-ROM driver unit 14 from the detection data by the disc detecting unit 14b and the data read from the loaded disk (step 102).

Figure 4:
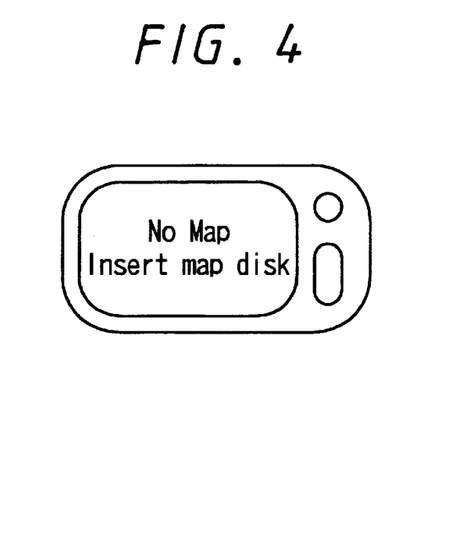
FIG. 4 is an illustration of an example of display according to the embodiment.

If it is determined here that the disk 14a having map data recorded thereon is not loaded, a display signal is generated and supplied to the display 15 to show an indication of the absence of a map disk on the screen of the display 15 (step 103). For example, the indication shown in this case may be characters that read "There is no map. Please load a map disk." as shown in FIG. 4 or the like.

When it is detected that a map disk is loaded on the CD-ROM driver unit 14, it is determined whether or not the map screen (image) data is saved in the data saving memory 18 (step 104). In the system controller 11 of the present embodiment, a data saving flag is set to allow the determination on the saving of the map data. In this case, when "1" is set as the data saving flag, it means that there is saved data. When "0" is set as the data saving flag, it means that there is no saved data.

Therefore, it is determined whether the data saving flag is "1" or not to determine whether the map screen data is saved or not at step 104. If it is determined that the data saving flag is "1", which indicates that the data saving memory 18 saves the map screen data, the map screen data saved in the memory 18 is read out under the control of the system controller 11, and the map screen data is supplied to the display 15 as a display signal to display a map according to the data which has been saved on the screen of the display 15 (step 105).

If it is determined that the data saving flag is "0", which indicates that the data saving memory 18 does not store map screen data, at step 104, data for a map in the vicinity of the current position is read from the map disk loaded in the CD-ROM driver 14; the read map data is temporarily stored in the image data memory 17 to perform a draw map process; and the screen data for the map thus drawn is converted into a display signal which is supplied to the display 15 to display the map on the screen of the display 15 (step 106).

Once a map is displayed at the step 105 or step 106, the data saving flag is set to "0" (step 107). The processes up to here are those upon activation.

Once the display of a map is thus activated, a process of updating a determined current position is carried out in accordance with changes in the position measured by the GPS signal processing unit 12 or the like to move a cursor position showing the current position on the map. When the displayed range of the map must be scrolled as a result of the movement of the position, the map data for the relevant area is read from the map disk loaded on the CD-ROM driver unit 14, and the relevant map is displayed on the display 15 based on the read map data (step 108). The process at step 108 is a normal operation process which is general to the navigation apparatuses.

When this normal operation is performed, the system controller 11 determines whether or not the operation of turning the power supply off has been performed through an operation of the power supply key or the like (step 109). If the operation of turning the power supply off has not been performed, the normal operation at step 108 is repeated and, if the operation of turning the power supply off has been performed, the process proceeds to a data saving process. In this data saving process, the map data for generating the map display screen currently displayed on the display 15 (this map data is stored in the image data memory 17) is transferred to and stored in the data saving memory 18, and the data saving flag is set to "1" (step 110). After this data saving process is completed, the system controller 11 performs control to turn the power supply of each part off.

As the map data saved in the data saving memory 18 at the step 110, for example, image data (e.g., image data in the form of a bit map) which has been read from the map disk and subjected to a picture drawing process is stored. Alternatively, data of the roads in the range that forms the image data (e.g., vector data read from the map disk and so on) may be stored as it is. In addition, a display signal (e.g., a video signal such as an RGB signal or the like) for supplying the image data which has been subjected to a drawing process to the display 15 may be stored in the data saving memory 18.

Since the process is thus carried out in conjunction with the turning on/off of the power supply, when the power supply of the navigation apparatus is turned off, the data for the map which has been displayed immediately before the turning off is saved in the data saving memory 18 which is a non-volatile storage means. When the power supply is turned on again, such a process is carried out in which the road map is displayed on the display 15 based on the saved map data. Thus, the road map is immediately displayed without a process of reading the map data from the map disk when the power supply is turned on. This makes it possible to significantly reduce the waiting time spent before the map is displayed unlike the prior art wherein several tens of seconds have been spent after turning the power supply on. In general, the power supply of the navigation apparatus loaded on the automobile is normally kept on during the driving and is turned off when the automobile is not driven, e.g., when it is parked. Therefore, it may be considered that there is substantially no change in the position of the automobile loaded with the navigation apparatus when the power supply is off. When the same map which has been displayed immediately before the power supply is turned off is displayed when the power supply is turned on as in the present embodiment, a map of roads in the vicinity of the current position is displayed, and the displayed road map allows preferable navigation as soon as the power supply is turned on.

Figure 5:
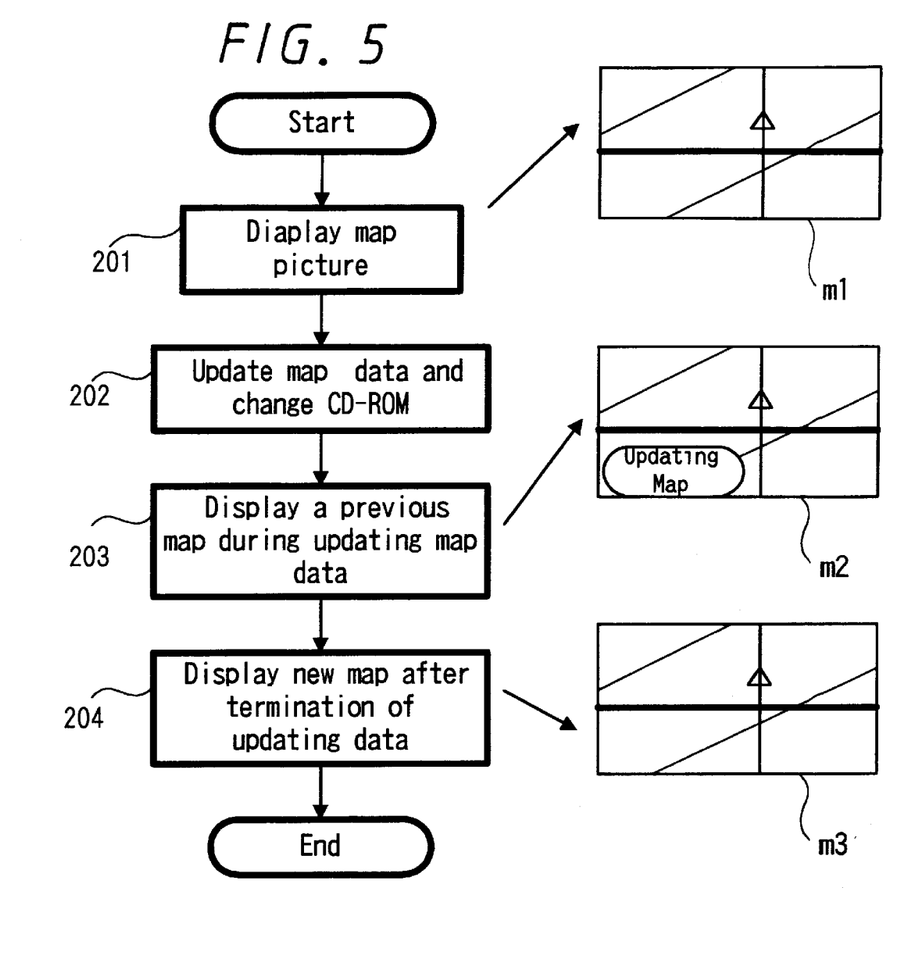
FIG. 5 shows a flow chart of a process performed when a recording medium is replaced and a display example according to the embodiment.

A description will now be made with reference to the flow chart in FIG. 5 on a process performed in the navigation apparatus of the present embodiment under the control of the system controller 11 when the CD-ROM (map disk) 14a loaded on the CD-ROM driver unit 14 is replaced while the power supply of the apparatus is in an on-state. First, let us assume that such a process is carried out in which a map screen m1 according to the map data read from the map disk before the replacement is being displayed on the display 15 (step 201).

When a CD-ROM replacing operation to update the map data with data from another disk is performed (step 202), the map data which has been used to display the map screen on the display 15 immediately before the map disk is removed from the CD-ROM driver unit 14 is saved in the data saving memory 18, and a map screen m2 which has been displayed at the time of the removal of the map disk is continuously displayed on the display 15 using the saved map data (step 203). Although at this time the map screen m2 has the same contents as those of the map screen m1, "the map being updated" is displayed by characters and so on.

When a new map disk is loaded on the CD-ROM driver unit 14, and a data updating process using the newly loaded map disk is completed to allow data from the loaded map disk to be read, map data and the like are read from the map disk and a new map screen m3 according to the map data is displayed on the display 15 (step 204). At this time, the map screen m3 may be a map which shows the same position as the map screen m1 but narrower roads thereof.

As described above, when a disk map is replaced while the power supply is in an on-state, a map read from the disk before the replacement is continuously displayed until map information or the like from a newly loaded map disk becomes readable. This eliminates any state wherein no map is displayed during the updating process at the time of disk map replacement to allow a map to be continuously displayed.

When a map disk is replaced while the power supply is in the on-state, the image data memory 17 may be used as a memory for saving the map data during the replacement instead of the data saving memory 18 which is a non-volatile storage means, and the data stored in the image data memory 17 may be maintained as it is.

Figure 6:
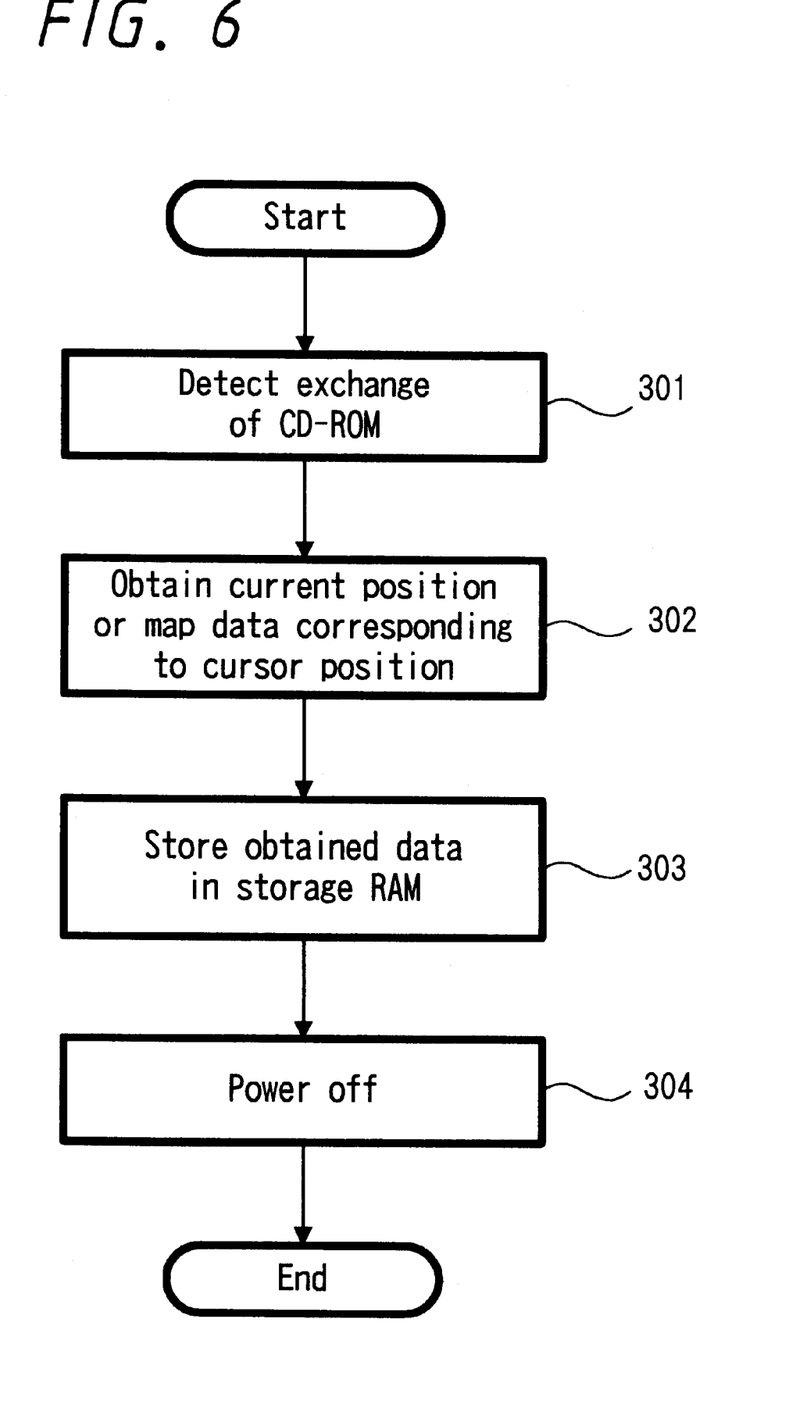
FIG. 6 is a flow chart of a process performed when a recording medium is replaced with the apparatus according to the embodiment in a non-operating state.

A description will now be made with reference to the flow chart in FIG. 6 on a process performed in the navigation apparatus of the present embodiment under the control of the system controller 11 when the CD-ROM (map disk) 14a loaded on the CD-ROM driver unit 14 is replaced while the power supply is in an off-state.

First, in this embodiment, the operations of the key for loading and removing a disk are always accepted when the power supply of the navigation apparatus 10 is off without turning the main power supply of the apparatus on, and the operations can be determined by the system controller 11. When the replacement of the CD-ROM disk (map disk) 14a is detected from the detection data of the disk detecting unit 14b with the power supply in the off-state (step 301), the power supply of the apparatus is turned on under the control of the system controller 11, and the GPS signal processing unit 12 is activated for measuring the current position to determine the current position (step 302). The data of the position measured immediately before the power supply is turned off may be stored in the saving memory 18 to allow the determination of the position using the data. Alternatively, the position may be determined based on the display position of the map indicated by a cursor or the like before the power supply is turned off.

Data of a map in the vicinity of the position determined at step 302 is read from the newly loaded map disk and saved by storing it in the data saving memory 18 which is a non-volatile storage means (step 303). Upon completion of the process of saving the read data, the apparatus will stand by with the power supply in the off-state under the control of the system controller 11 (step 304).

Such a process makes it possible to significantly reduce waiting time spent before a map is displayed when the power supply of the navigation apparatus 10 is turned on through the operation of the power supply key or the like. Specifically, a map display process can be immediately displayed when the power supply is turned on using the map data stored in the data saving memory 18. This makes it possible to significantly reduce the waiting time when the power supply is turned on compared to the case wherein a map is displayed by reading map data from a newly loaded or replaced map disk after the power supply is turned on.

Figure 7A:
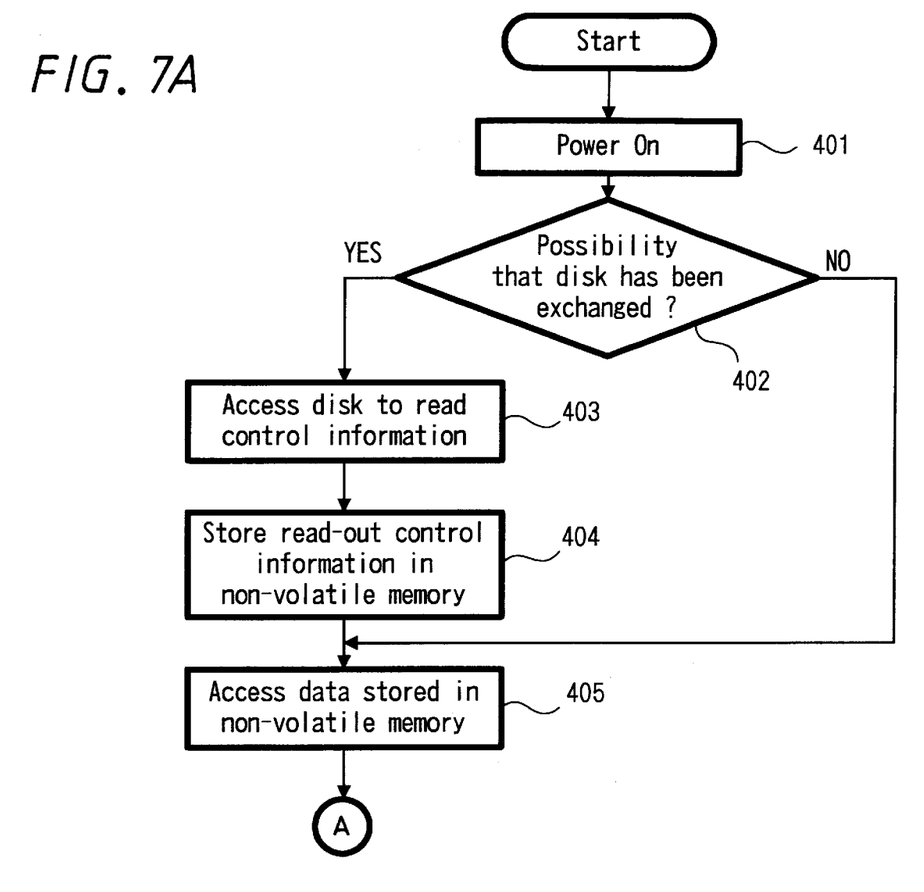
FIGS. 7A and 7B are a flow chart of a process of saving data such as a parameter and so on according to the embodiment.
Figure 7B:
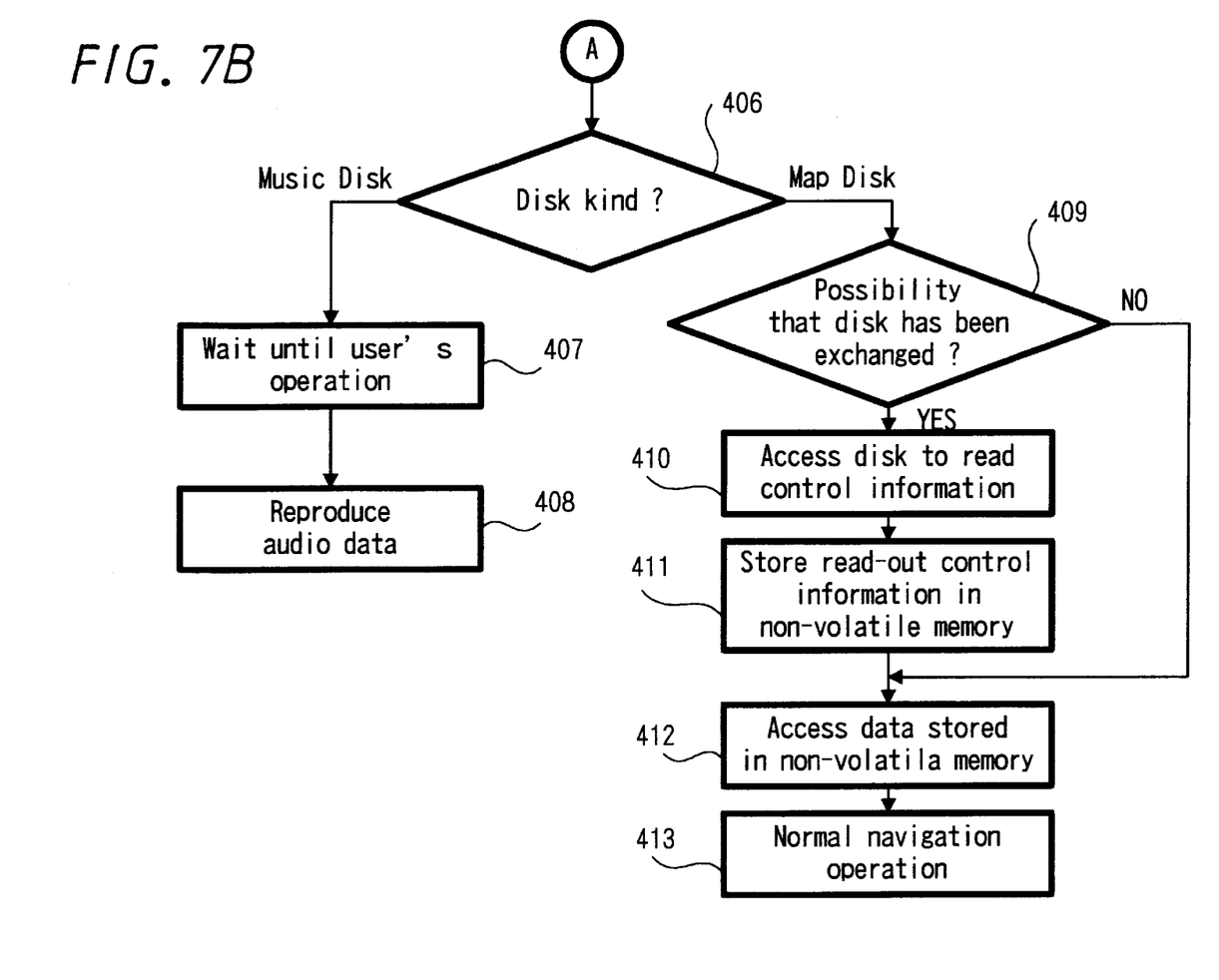

Although map data itself recorded in the CD-ROM is saved in the data saving memory 18 to reduce waiting time in each of the above-described processes, other data in the map disk which is a recording medium may be saved in the data saving memory 18 to reduce the waiting time. The flow chart in FIGS. 7A and 7B shows an example of this process wherein it is determined whether there is a possibility that the disk has been replaced at the CD-ROM driver unit 14 (step 402) when the power supply is on or the power supply has been turned on from the power supply off-state as a result of disk replacement (step 401) and, if there is a possibility that the disk has been replaced, the disk loaded in the CD-ROM driver unit 14 is accessed to read control information such as a TOC (table of contents), a disk label and so on recorded on the innermost track of the disk or the like (step 403). The control information (TOC, disk label, etc.) of the disk read at this time is saved in the data saving memory 18 which is a non-volatile storage means under the control of the system controller 11 (step 404).

When this saving process is completed or when it is determined at step 402 that the disk has not been replaced, the system controller 11 accesses the data saved in the data saving memory 18 (step 405) to determine the type of the disk loaded therein (step 406). If it is determined that the disk is a CD (music disk) on which audio data is recorded, upon a reproducing operation selection by a user (step 407), the audio data is reproduced from the loaded disk (step 408) with the recording position of each piece of musics (tracks) determined from the control data saved in the data saving memory 18 to output music or the like by the audio output unit 16 or the like. In doing so, information including track numbers, duration of pieces of musics is displayed on the display 15 or the like using the control data saved in the data saving memory 18.

When it is determined at step 406 that the disk is a map disk, another determination is made on whether or not there is a possibility that the disk has been replaced again (step 409). If there is a possibility that the disk has been replaced, the disk loaded on the CD-ROM driver unit 14 is accessed to read various control informations unique to a map disk such as drawing parameters and the like required for a map disk (step 410). The read drawing parameters at this time are saved in the data saving memory 18 which is a non-volatile storage means under the control of the system controller 11 (step 411).

When it is determined again at step 409 that the disk has not been replaced after the drawing parameters and so on are saved, the system controller 11 fetches the control information such as the drawing parameters or the like saved in the data saving memory 18 if a map must be displayed (step 412). Map data recorded on the map disk is subjected to a drawing process using the control information such as the drawing parameters or the like thus fetched to perform a navigation operation process for displaying a road map showing the current position and the like (step 413).

Since the control information recorded on the loaded disk is saved in a non-volatile storage means and processes such as drawing of a map or the like are performed based on the saved data as described above, there is no need for reading such control information from the loaded disk at the time of turning on the power supply or the like, which makes it possible to initiate the process of drawing a map immediately to reduce waiting time spent before a map is displayed at the time of turning on the power supply or the like. Further, it is possible to reduce the number of accesses required until a desired map is displayed and therefore to reduce the consumption of power required to display a map.

The process of saving the control information described in the flow chart of FIGS. 7A and 7B may be used in conjunction with the process of saving the map data itself described with reference to the flow chart in FIG. 3 and the like.

While the above-described embodiment is applied to a case wherein the current position of an automobile is detected by the navigation apparatus loaded thereon and a map of roads in the vicinity of the position is displayed based on data recorded on a CD-ROM, the embodiment may obviously be applied to processes at a display apparatus which uses other similar recording media (e.g., disk-type recording media, tape-type recording media, cartridge-type recording media, card-type recording media) or the like and performs various types of display based on the information read from the media.

According to the method of display of the present invention, a display process can be immediately initiated when a power supply is activated based on information saved in a non-volatile storage means immediately before the power supply is turned off to eliminate waiting time during which no information is displayed.

According to this method of display, predetermined information, i.e., image information which has been displayed immediately before the power supply is turned off and the image information read from the non-volatile storage means, is displayed until a process of generating an image to be displayed can be initiated as a result of the turning on of the power supply. Thus, an image which has been displayed immediately before the power supply is turned off is immediately displayed after the power supply is turned on to display an appropriate image immediately after the power supply is turned on.

Further, when the image immediately before the power supply is turned off is displayed, image information that causes display of a map is provided. As a result, the map which has been displayed immediately before the power supply is turned off is displayed again when the power supply is turned on, which allows preferable guidance to be provided immediately after the power supply is turned on.

Furthermore, the image which has been displayed immediately before the power supply is turned off is displayed at least during the period of a process of reading image information from a predetermined recording medium. As a result, even when the process of reading the recording medium takes time, a preferable image is displayed during the waiting time.

The predetermined information in the above-described method of display may be control data for a predetermined recording medium and, when it is determined that the recording medium has not been replaced before the power supply is turned on after once being turned off, a process is performed to display information recorded on the recording medium based on the control data read from a non-volatile storage means. This eliminates a need for reading various control data of the recording medium after the power supply is turned on and reduces the time spent before the information is displayed after the power supply is turned on accordingly.

Further, according to the method of display of the present invention, when a first recording medium is replaced with a second recording medium with an image read from the first recording medium is displayed, the image is displayed based on image information saved in a storage means. This makes it possible to eliminate a non-display state when a recording medium is replaced.

By providing image information that causes display of a map in this method of display, a map which has been displayed immediately before the power supply is turned off can be displayed again after the power supply is turned on. This makes it possible to provide preferable guidance using a map immediately after the power supply is turned on.

According to the method of storing image information of the present invention, when a recording medium having information for displaying an image stored therein is replaced, new image information is read from a new recording medium immediately after the replacement of the recording medium whether a means for displaying an image has been activated or not, and the read image information is stored in a predetermined storage means. As a result, when a means for displaying an image initiates a process of actually displaying an image, an image can be immediately displayed based on the read image information to reduce the time for activation spent before the display is started.

According to this method of storing image information, by providing image information that causes display of a map, guidance using a map from a newly loaded storage medium can be preferably provided with a short waiting time.

In the display apparatus according to the present invention, predetermined information read immediately before the power supply is turned off is saved by a non-volatile storage means, and a desired display process based on the saved predetermined information is performed when the power supply is turned on. Thus, a display process can be immediately performed when the power supply is activated based on the information saved in the non-volatile storage means immediately before the power supply is turned off to eliminate waiting time during which no information is displayed.

The predetermined information for this display apparatus may be information on a map which has been displayed immediately before the power supply is turned off, and a map may be displayed based on the information read from a non-volatile storage means until a process of displaying a map based on information read from the recording medium can be initiated when the power supply is turned on. This makes it possible to eliminate waiting time during which no map is displayed.

Further, in the above-described display apparatus, control data for the recording medium is provided as the predetermined information, and a display processing means performs a process of displaying the information recorded on the recording medium based on the control data saved in the non-volatile storage means. This eliminates a need for reading various control data for the recording medium after the power supply is turned on and makes it possible to reduce the time spent before information is displayed after the power supply is turned on accordingly.

In the display apparatus according to the present invention, predetermined information may be read from a newly loaded recording medium and saved in a storage means when a detecting means detects replacement of the recording medium while the display processing means is not performing the process of generating a display signal. As a result, when the display process is initiated, display can be performed by immediately generating the display signal without reading the information from the recording medium, which prevents the waiting time during which no display is provided from being extended by the replacement of the recording medium.

Further, in the navigation apparatus according to the present invention, predetermined information read from a recording medium may be saved by a non-volatile storage means immediately before the power supply is turned off, and a process is performed when the power supply is turned on to generate a display signal based on the predetermined information saved in the non-volatile storage means. Thus, when the power supply is turned on, predetermined information can be immediately displayed based on the information which has been available before the power supply is turned off to provide navigation.

In this navigation apparatus, information on a map which has been displayed immediately before the power supply is turned off may be provided as the predetermined information, and a display signal for a map based on the information read from the non-volatile storage means may be generated until a map based on information newly read from the recording medium can be generated when the power supply is turned on. As a result, the map which has been displayed immediately before the power supply is turned off is immediately displayed when the power supply is turned on to provide preferable navigation.

The predetermined information in the above-described navigation apparatus may be control data of a predetermined recording medium and, when it is determined that the recording medium has not been replaced before the power supply is turned on after once being turned off, a process is performed to control reading and to generate a display signal based on the saved control data. This eliminates a need for reading various control data from the recording medium after the power supply is turned on and reduces the time spent before information for navigation is displayed accordingly.

Further, in the navigation apparatus according to the present invention, predetermined information is read from a newly loaded recording medium and saved in the storage means when replacement of the recording medium is detected while the process of generating a display signal is not being performed. This makes it possible to display a map or the like immediately when the display process is initiated without reading the information from the recording medium, which prevents the extension of waiting time during which a map or the like is not displayed due to the replacement of the recording medium.

An automobile according to the present invention is loaded with a navigation apparatus in which predetermined information read from a recording medium is saved by a non-volatile storage means immediately before the power supply of the navigation apparatus is turned off and a process is performed when the power supply is turned on to generate a display signal based on the predetermined information saved in the non-volatile storage means. Thus, it is possible to provide navigation by displaying predetermined information immediately when the power supply is turned on based on the information which has been available immediately before the power supply is turned off and to immediately determine the course that the automobile is to follow based on the displayed information.

In this automobile, information on a map which has been displayed immediately before the power supply is turned off may be provided as the predetermined information, and a display signal for a map based on the information read from the non-volatile storage means may be generated until a map based on information newly read from the recording medium can be displayed when the power supply is turned on. As a result, the map which has been displayed immediately before the power supply is turned off is immediately displayed when the power supply is turned on to provide preferable navigation.

The predetermined information in the above-described automobile may be control data of a predetermined recording medium and, when it is determined that the recording medium has not been replaced before the power supply is turned on after once being turned off, a process is performed to control reading and to generate a display signal based on the saved control data. This eliminates a need for reading various control data from the recording medium after the power supply is turned on and reduces the time spent before information for navigation is displayed accordingly.

Further, in the automobile according to the present invention, predetermined information is read from a newly loaded recording medium and saved in the storage means when replacement of the recording medium is detected while the process of generating a display signal is not being performed. This makes it possible to display a map or the like immediately when the display process is initiated without reading the information from the recording medium, which prevents the extension of waiting time during which a map or the like is not displayed due to the replacement of the recording medium.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A navigation apparatus comprising:
power supply control means for controlling turning on/off of a power supply;
position measuring means;
reading means for reading predetermined information including map information and information associated therewith from a recording medium;
read control means for controlling said reading means to read the map information of a map in a vicinity of a position measured by said position measuring means;
non-volatile storage means for saving as stored information the predetermined information read by said reading means; and
display processing means for generating a display signal based on one of the predetermined information read by said reading means and the stored information saved in said non-volatile storage means,
wherein the predetermined information read by said reading means is saved in said non-volatile storage means immediately before said power supply control means turns the power supply off and generation of the display signal based on the stored information saved in said non-volatile storage means is performed when said power supply control means turns the power supply on, and when said recording medium is replaced by an other recording medium said display processing means generates the display signal based on the stored information saved in said non-volatile storage means until said display processing means generates another display signal based on another predetermined information read by said reading means from the other recording medium.

2. A navigation apparatus according to claim 1, wherein the stored information includes the map information of the map displayed immediately before the power supply is turned off, and a first display signal based on the stored information read from said non-volatile storage means is generated until a second display signal based on newly read predetermined information read by said reading means is generated by turning said power supply on.

3. A navigation apparatus according to claim 1, further comprising detecting means for detecting whether the recording medium has been replaced before said power supply control means turns the power supply on after turning it off once, wherein the predetermined information includes control data recorded on the recording medium, and a control by said read control means and generation of a second display signal based on the predetermined information recorded on the recording medium at said display processing means are performed based on the control data of the predetermined information saved in said non-volatile storage means when said detecting means detects that the recording medium has not been replaced before said power supply control means turns the power supply on after turning it off once.

4. A navigation apparatus comprising:

position measuring means;

reading means for reading predetermined information including a map information and associated information associated therewith from a recording medium;

detection means for detecting a loading and removal of the recording medium loaded on said reading means;

read control means for controlling said reading means to read the map information of a map in a vicinity of a position measured by said position measuring means;

storage means for saving as stored information the predetermined information read by said reading means; and display processing means for generating a display signal based on the stored information saved in said storage means, wherein when said detection means detects a replacement of the recording medium by an other recording medium said display processing means generates the display signal based on the stored information saved in said storage means until said display processing means generates another display signal based on another predetermined information read by said reading means from the other recording medium.

5. An automobile loaded with a navigation apparatus comprising:

power supply control means for controlling turning on/off of a power supply in a part related to a navigation;

position measuring means for measuring a position of the automobile;

reading means for reading predetermined information including map information and associated information associated therewith from a recording medium;

read control means for controlling said reading means to read the map information of a map in a vicinity of a position measured by said position measuring means;

non-volatile storage means for saving as stored information the predetermined information read by said reading means;

display processing means for generating a display signal based on one of the predetermined information read by said reading means and the stored information saved in said non-volatile storage means; and display means for displaying an image based on the display signal generated by said display processing means, wherein the predetermined information read by said reading means is saved by said non-volatile storage means immediately before said power supply control means turns the power supply off, and a generation of the display signal based on the stored information saved in said non-volatile storage means is performed when said power supply control means turns the power supply on, and when said recording medium is replaced by an other recording medium said display processing means generates the display signal based on the stored information saved in said non-volatile storage means until said display processing means generates another display signal based on another predetermined information read by said reading means from the other recording medium.

6. An automobile according to claim 5, wherein the stored information includes the map information of the map displayed immediately before the power supply is turned off, a first display signal of a first map based on the stored information read from said non-volatile storage means is generated until a second display signal of a second map based on newly-read predetermined information read by said reading means is generated by turning the power supply on, and the image displayed by said display means is based on one of the first display signal and the second display signal.

7. An automobile according to claim 5, further comprising detecting means for detecting whether the recording medium has been replaced before said power supply control means turns the power supply on after turning it off once, wherein the predetermined information includes control data recorded on the recording medium; and a control by said read control means and generation of the display signal of the predetermined information recorded on said recording medium by said display processing means are performed based on the control data of the predetermined information saved in said non-volatile storage means when said detecting means detects that said recording medium has not bee replaced before said power supply control means turns the power supply on after turning it off once.

8. An automobile loaded with a navigation apparatus comprising:
- position measuring means for measuring a position of the automobile;
- reading means for reading predetermined information including a map information and associated information associated therewith from a recording medium;
- detection means for detecting a loading and removal of the recording medium loaded on said reading means;
- read control means for controlling said reading means to read the map information of a map in a vicinity of the position measured by said position measuring means;
- storage means for saving the predetermined information read by said reading means; and
- display processing means for generating a display signal of the map based on the predetermined information saved in said storage means,
- wherein when said detection means detects a replacement of the recording medium by an other recording medium said display processing means generates the display signal based on the predetermined information saved in said storage means until said display processing means generates another display signal based on another predetermined information read by said reading means from the other recording medium.

* * * * *